United States Patent Office 3,729,546
Patented Apr. 24, 1973

3,729,546
CHEESE EMULSIFYING AGENT
Russell N. Bell, Ardsley, N.Y., assignor to Stauffer Chemical Company, New York, N.Y.
No Drawing. Filed May 6, 1970, Ser. No. 35,271
Int. Cl. C01b 25/26, 15/16
U.S. Cl. 423—306    4 Claims

ABSTRACT OF THE DISCLOSURE

The invention provides a composition which is useful as a cheese emulsifying agent, and the process for making the same. The composition has the empirical formula:

$$Na_4Al_3(OH)_4(PO_4)_3 \cdot \pm 12H_2O$$

This invention relates to a composition which is useful as a cheese emulsifier, a process for preparing the same, and to process cheese formulations containing the same. More particularly, this invention relates to a sodium aluminum phosphate composition of relatively high sodium content.

There are several phosphate materials known as cheese emulsifiers such as disodium orthophosphate, trisodium phosphate, and the like. However, these materials all have serious limitations as cheese emulsifiers and therefore cannot always be used to the extent desired for cheese emulsification. For example, disodium orthophosphate is generally satisfactory as a cheese emulsifier below 1.6% (based on the total weight of cheese) but when used in greater amounts, hydrated crystals of the phosphate form which is, accordingly, quite objectionable. More recently, sodium aluminum phosphates have been combined with other phosphates such as disodium orthophosphate to form useful compositions for emulsifying cheese which minimize the tendency to crystallize even when used in levels up to about 3%.

It has been found in accordance with the present invention, that a new sodium aluminum phosphate composition of relatively high sodium content can be prepared. This new phosphate composition, of relatively high sodium content, has as a cheese emulsifier, the recognized advantages of sodium aluminum phosphates and in addition imparts to cheeses the quality of maintaining their melt properties over a long period of time.

The sodium aluminum phosphate of the present invention can be characterized by the following empirical formula:

$$Na_4Al_3(OH)_4(PO_4)_3 \cdot \pm 12H_2O$$

Hereinafter, the phosphate will be referred to as a (4:3:3) phosphate composition.

The sodium aluminum phosphate can be prepared either by crystallization from solution, or by a total evaporation process, as described hereinbelow.

When placed in water, this (4:3:3) phosphate composition disproportionates, forming a soluble and an insoluble fraction. The rate of disproportion and formation of the soluble fraction varies with the temperature of the water.

The phosphate composition will generally have a water-soluble fraction between about 5 and 20 weight percent.

The following approximate percentages of solubles develop when the 4:3:3 phosphate product is kept in water at ±90° C. for 1 to 7 days.

| Period (days) | Solubility (percent) |
|---|---|
| 1 | ±5 |
| 2 | ±8 |
| 5 | ±12 |
| 6 | ±14 |
| 7 | ±15 |

The novel, reaction product of the present invention is generally prepared by reacting aluminum phosphate with an alkaline solution of sodium phosphate. The aluminum phosphate may be either an acidic solution of monoaluminum phosphate, $Al(H_2PO_4)_3$, or a thick slurry of freshly precipitated aluminum phosphate, $AlPO_4$.

It may also be prepared from sodium aluminate and an acidic sodium phosphate.

The (4:3:3) phosphate composition, is formed when the crystallization temperature is low, preferably at room temperature, or about 30° C. If the temperature is considerably higher, such as about 100° C., an entirely different phosphate composition is formed. Such a phosphate composition would be an (8:2:4) phosphate composition as described in my copending application, Ser. No. 35,268, filed May 6, 1970.

The crystallization process for preparing the (4:3:3) phosphate composition, comprises initially reacting aluminum hydrate with a slight excess of hot (100° C.) phosphoric acid solution. After cooling, this monoaluminum phosphate solution is diluted and added slowly with good agitation to a strong hot (70° to 100° C.) alkaline sodium phosphate solution.

The alkalinity of the sodium phosphate solution is such that the final pH (2 milliliters diluted to 150 milliliters) will be between 10.0 and 11.5, after the addition of the monoaluminum phosphate solution.

The liquor must be cooled, preferably to around 30° C., and agitated while crystallization takes place. Crystallization of the (4:3:3) phosphate composition requires a few days to be complete.

The reaction product is filtered off and washed quickly, first with water at room temperature, and then with acetone. The crystals are then dried at 50° to 60° C. with the dry product resulting.

The components used in the crystallizing preparation of the (4:3:3) phosphate composition are generally in the following amounts: between about 125 and 150 grams of phosphoric acid (75%); between 15 and 25 grams of aluminum hydrate; between 320 and 400 grams of monosodium phosphate, between about 400 and 500 grams of sodium hydroxide, (50%), and the remaining portion of the mixture being water in the quantity of between about 1000 to 2500 grams, depending upon the amounts of the other components mixed.

The yield may be as high as 86%, based on the aluminum added.

The total evaporation process for preparing the (4:3:3) phosphate composition comprises initially preparing a phosphoric acid solution by the addition of $H_3PO_4$ (85%) to distilled water. The acid solution is added slowly with agitation to a sodium aluminate solution. The final slurry is then dried under a suitable vacuum at a temperature of about 35° to 50° C.

The alkalinity of the resulting phosphate composition is such that a 1% dispersion has a pH between about 10 and 11.

The (4:3:3) phosphate composition produced according to this invention has exhibited good qualities. For example, as a cheese emulsifying agent, it has provided improved properties in process cheese such to stabilize cheese compositions to which it is added. Also, the phosphate composition has shown some melt increase after 9 days storage and was approximately equivalent to disodium phosphate after 42 days storage either at 50° C. or at the refrigerated temperature.

The following specific examples illustrate the processes of the present invention and aluminum phosphate reaction products prepared thereby.

EXAMPLE 1

Preparation of (4:3:3) sodium aluminum phosphate by crystallization

A first solution (A) was prepared by stirring 466 grams of sodium hydroxide (50%) into 1700 milliliters of distilled water in a 2000 milliliter Pyrex beaker. 340 grams of anhydrous monosodium phosphate ($NaH_2PO_4$) was then added and dissolved. The resulting solution (A) was filtered through a coarse fritted glass filter and reheated to 80° C.

A second solution (B) was prepared by adding slowly, while stirring, 18.2 grams of 200 mesh aluminum hydrate to 143 grams of hot (100° C.) phosphoric acid (75%). Then, 218 grams of this 50% monoaluminum phosphate solution was diluted with 100 milliliters of distilled water. This was added slowly to solution (A) while stirring. The final solution was filtered through a coarse fritted glass filter and cooled to room temperature. Two milliliters of the solution diluted to 150 milliliters had pH of about 10.9. The liquor was transferred to a 2000 milliliter beaker and held at 30° C. while stirring with a magnetic stirrer for 6 days.

The resulting slurry was filtered with vacuum on a coarse fritted glass filter, washed quickly several times with cool distilled water then with 10% acetone and finally with 95% acetone. The slightly damp product was dried overnight under vacuum at 50° C. The dried product which passed through a 325 mesh sieve without milling, weighed 70 grams. This represented an 86% yield on the basis of the $Al_2O_3$.

The product had the following analysis:

| | Percent |
|---|---|
| $Na_2O$ | 16.9 |
| $Al_2O_3$ | 21.4 |
| $P_2O_5$ | 29.0 |
| Loss on ignition | 33.0 |

EXAMPLE 2

Total evaporation preparation of (4:3:3) sodium aluminum phosphate

A phosphoric acid solution was prepared by the addition of 65 grams of 85% $H_3PO_4$ to 100 ml. of distilled water. This solution was added slowly, with agitation, to a solution of 65 grams of reagent grade sodium aluminate in 100 ml. of distilled water. The rate of addition was such that with some external cooling the slurry temperature was maintained below 60° C. The final slurry was dried under vacuum at 40° C. When apparently dry, it was removed, crushed and redried for four hours at 40° C. under vacuum.

The dried product had the following analysis:

| | Percent |
|---|---|
| $Na_2O$ | 18.7 |
| $Al_2O_3$ | 23.6 |
| $P_2O_5$ | 33.0 |
| Loss on ignition | 24.2 |
| pH on 1% suspension | 10.5 |

What is claimed is:

1. A sodium aluminum phosphate composition useful as a cheese emulsifier having the empirical formula:

$$Na_4 \cdot Al_3 \cdot (OH)_4 \cdot (PO_4)_3 \cdot O - 12H_2O$$

which disproportionates in water to a soluble fraction of between about 5 and about 20 percent by weight of the composition.

2. A phosphate composition according to claim 1, wherein said composition when placed in water disproportionates to give a soluble fraction of between about 5 and 20 weight percent of the phosphate composition.

3. A method for preparing a sodium aluminum phosphate composition having the empirical formula:

$$Na_4 \cdot Al_3 \cdot (OH)_4 \cdot (PO_4)_3 \cdot O - 12H_2O$$

which comprises; preparing a first reaction mixture by reacting aluminum hydrate with phosphoric acid in an amount in excess of that required to react the aluminum hydrate to monoaluminum phosphate, forming a second reaction mixture by adding the first reaction mixture to an agitated alkaline solution of sodium hydroxide and monosodium phosphate provided in an amount such that the final pH of two milliliters of the second reaction mixture diluted to 150 milliliters is between 10.0 and 11.5 and agitating the second reaction mixture at a temperature about 30° C. until the composition having the empirical formula: $Na_4 \cdot Al_3 \cdot (OH)_4 \cdot (PO_4)_3 \cdot O - 12H_2O$ precipitates, and recovering the precipitated composition said reactants are provided in the proportions of between about 125 to about 150 parts of phosphoric acid based on 75 percent by weight phosphoric acid, between 15 and 25 parts aluminum hydrate; between 320 and 420 parts monosodium phosphate; between about 400 and about 500 parts of sodium hydroxide based on 50 percent by weight sodium hydroxide and between about 1000 and 2500 parts water.

4. A method for preparing a composition having the empirical formula:

$$Na_4 \cdot Al_3 \cdot (OH)_4 \cdot (PO_4)_3 \cdot O - 12H_2O$$

which comprises forming a reaction mixture having a ratio of Na:Al:P of 4:3:3 by reacting a phosphoric acid solution with a sodium aluminate solution and drying the reaction mixture at a temperature between about 30° C. and 60° C. to form the composition.

References Cited

UNITED STATES PATENTS

| | | | |
|---|---|---|---|
| 3,244,535 | 4/1966 | Lauck et al. | 99—117 |
| 3,311,448 | 3/1967 | Blanch et al. | 23—105 |
| 3,337,347 | 8/1967 | Kichline et al. | 99—117 |
| 3,097,949 | 7/1963 | Lauck et al. | 99—115 |
| 3,223,479 | 12/1965 | Vanstrom | 23—107 |
| 3,223,480 | 12/1965 | Vanstrom | 23—107 |
| 3,574,536 | 4/1971 | Vanstrom | 23—107 |

EARL C. THOMAS, Primary Examiner

G. A. HELLER, Assistant Examiner

U.S. Cl. X.R.

99—117